No. 711,247. Patented Oct. 14, 1902.
S. R. EVANS.
FOLDING CHILD'S CARRIAGE.
(Application filed Jan. 18, 1902.)
(No Model.) 3 Sheets—Sheet 1.
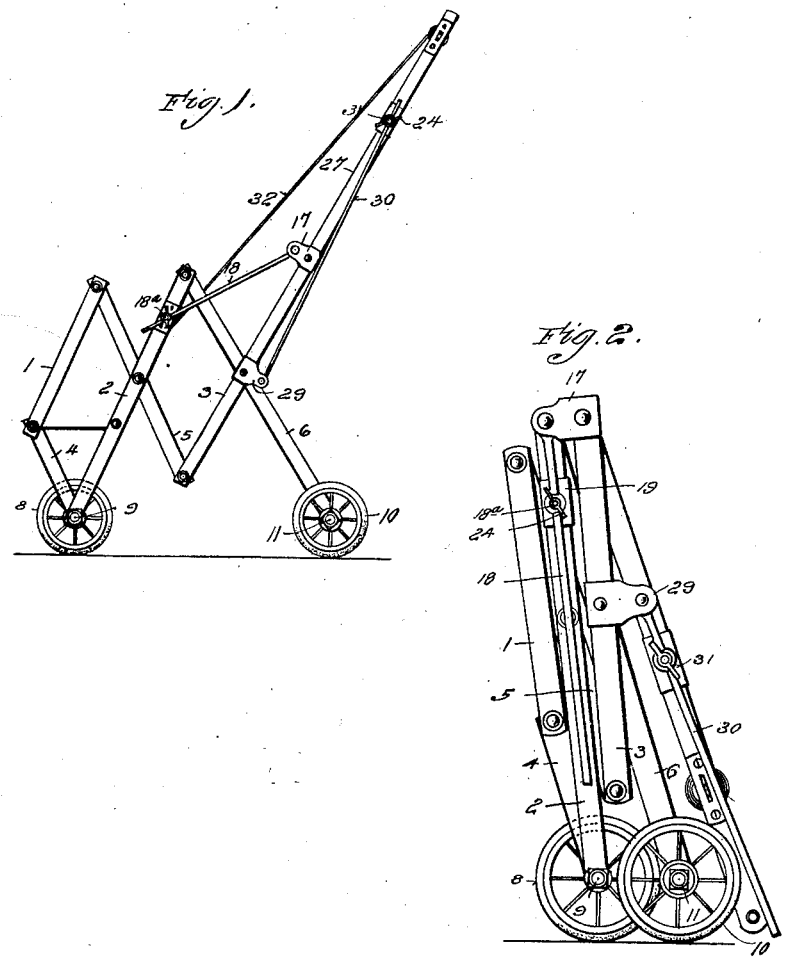
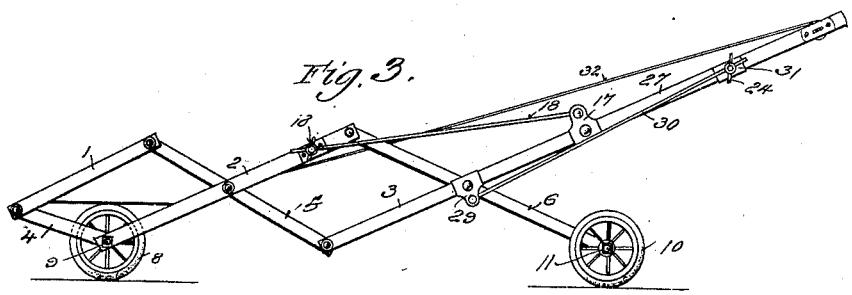
WITNESSES: INVENTOR.
Stephen R. Evans
BY
H. A. Toulmin,
ATTORNEY.
THE NORRIS PETERS CO., PHOTO-LITHO., WASHINGTON, D. C.

No. 711,247. Patented Oct. 14, 1902.
S. R. EVANS.
FOLDING CHILD'S CARRIAGE.
(Application filed Jan. 18, 1902.)

(No Model.) 3 Sheets—Sheet 2.

WITNESSES: INVENTOR.
Stephen R Evans
BY
ATTORNEY.

No. 711,247. Patented Oct. 14, 1902.
S. R. EVANS.
FOLDING CHILD'S CARRIAGE.
(Application filed Jan. 18, 1902.)
(No Model.) 3 Sheets—Sheet 3.
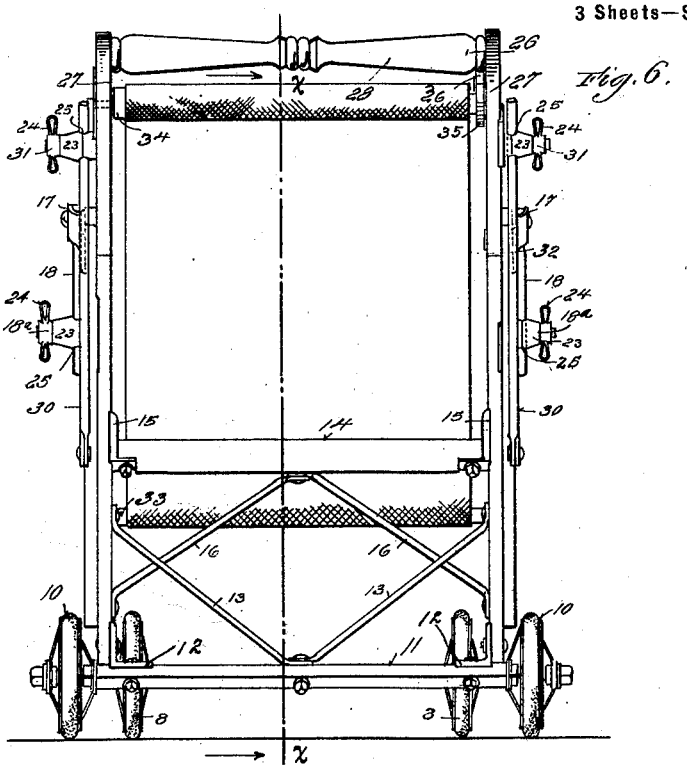
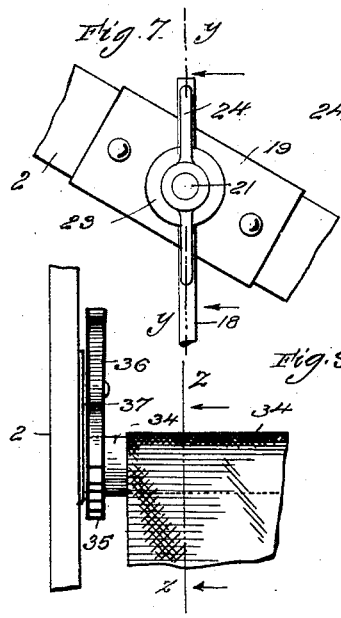
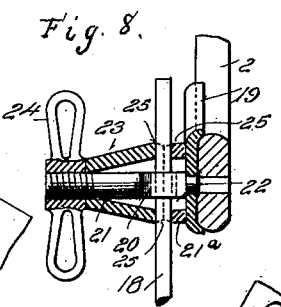
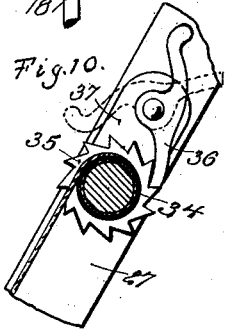
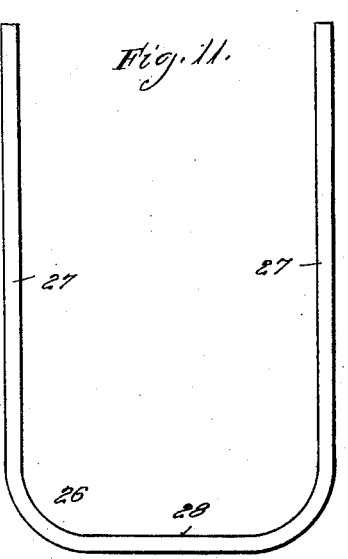
WITNESSES:
J. C. Dawley,
Will O'Laughlin
INVENTOR.
Stephen R. Evans
BY H. A. Toulmin,
ATTORNEY.

UNITED STATES PATENT OFFICE.

STEPHEN R. EVANS, OF GREENFIELD, OHIO.

FOLDING CHILD'S CARRIAGE.

SPECIFICATION forming part of Letters Patent No. 711,247, dated October 14, 1902.

Application filed January 18, 1902. Serial No. 90,232. (No model.)

*To all whom it may concern:*

Be it known that I, STEPHEN R. EVANS, a citizen of the United States, residing at Greenfield, in the county of Highland and State of Ohio, have invented certain new and useful Improvements in Folding Children's Carriages, of which the following is a specification, reference being had therein to the accompanying drawings This invention relates to folding children's carriages, and has for its object to provide a structure of this character adjustable as to its form or shape, so as to be capable of being arranged so as to form what is known as a "go-cart," resembling a chair with wheeled feet, which may be extended so as to form an almost flat couch-like vehicle and which is adapted to be folded into a very small compass, so as to be conveniently stored away in a small space or carried under the seat of an ordinary buggy or other similar vehicle.

To these and other ends my invention consists in certain novel features, which I will now proceed to describe and will then particularly point out in the claims.

Figure 4:
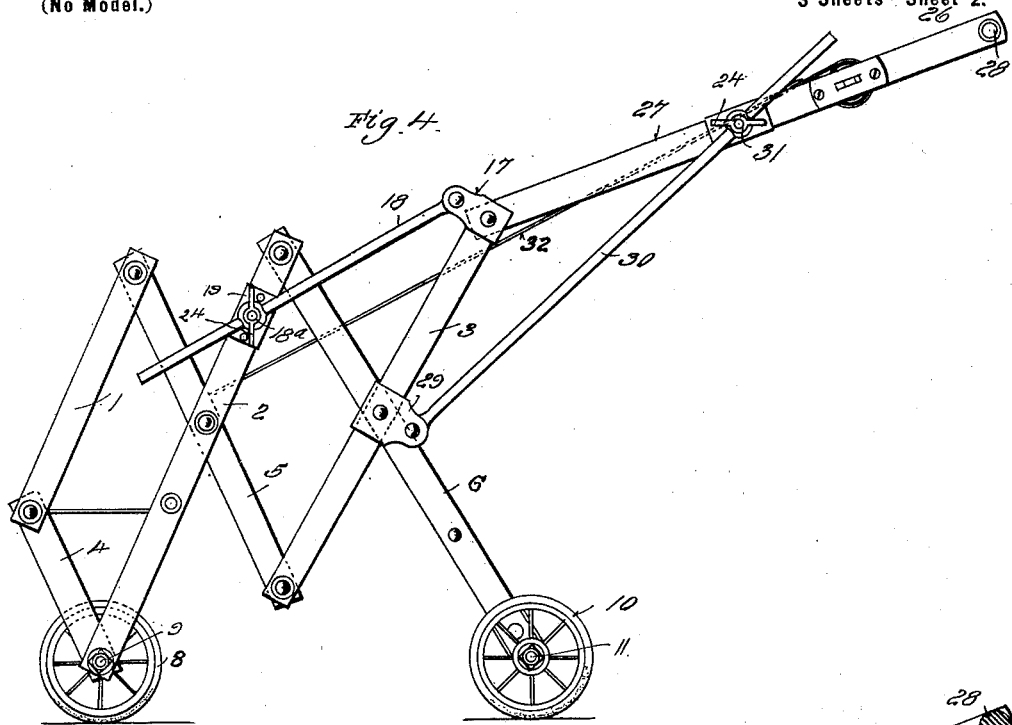
Figure 5:
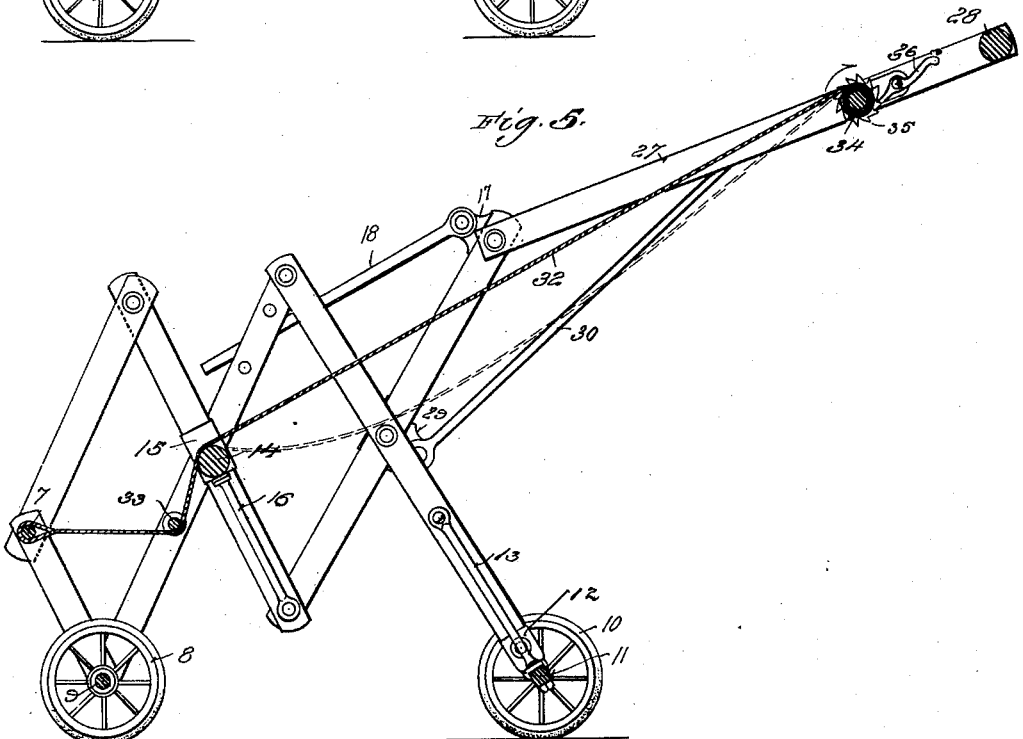

In the accompanying drawings, Figure 1 is a side elevation of my improved carriage so adjusted as to form a go-cart. Fig. 2 is a view of the same folded for storage or transport. Fig. 3 is a view of the same extended so as to form a substantially horizontal couch or support. Fig. 4 is a view similar to Fig. 1, showing the handle bent downward or rearward. Fig. 5 is a central sectional view taken on the line $x$ $x$ of Fig. 6. Fig. 6 is a rear elevation of what is shown in Fig. 4. Fig. 7 is a detail elevation of one of the clamps. Fig. 8 is a sectional view of the same, taken on the line $y$ $y$ of Fig. 7 and looking in the direction of the arrows. Fig. 9 is a detail view of a portion of the spring-roller and its ratchet mechanism. Fig. 10 is a detail sectional view taken on the line $z$ $z$ of Fig. 9, and Fig. 11 is a detail view of a modified form of handle.

The body or frame of the vehicle is composed of two parallel sets of lazy-tongs. Each set comprises three parallel upwardly and rearwardly extending members 1, 2, and 3 and three downwardly and rearwardly extending members 4, 5, and 6. The members 1 and 4 are shorter than the remaining members and are united at their forward ends by a cross-rod 7, on the ends of which they are pivotally mounted. The members 2 and 4 carry at their point of junction the front wheels 8, which are preferably mounted on an axle 9, on the ends of which the members 2 and 4 are pivoted, the wheels being preferably located on said axle within the frame. The rearmost pair of downwardly and rearwardly extending members—to wit, the members 6—carry at their lower ends the rear wheels 10, which are preferably mounted outside the members 6 on a transverse axle 11, secured to the member 6 by brackets 12. Braces 13 extend from the center of the axle 11 upward and outward to the members 6. It will be understood that where the lazy-tongs meet or cross they are suitably pivoted together. Between the pivotal junctions of the members 2 and 5 on each side of the frame there extends a cross-bar 14, secured to the members 5 by brackets 15, and braces 16 extend from the middle of this cross-bar to the lower ends of the members 5. In order to secure these lazy-tong frames in any position to which they may be adjusted, I employ suitable locking means, and for this purpose I prefer the construction shown, in which each set is provided with a rod pivoted to one member and passing through a swiveling clamp on another member of the set. In this construction there is attached to the top of each member 3 a bracket 17, to which is pivoted a rod 18, the free end of which extends through a clamp 18ª, swiveled on the member 2. This clamp comprises a base-plate 19, secured to the member and having swiveled therein an eyebolt 20, having a threaded extension 21, the rod 18 passing through the eye of the bolt. The clamp proper consists of an annular member 21ª, slotted, as indicated at 22, to slip over the eye of the bolt, and a conical member 23, also fitting over the eyebolt, the two clamping members being adapted to be clamped or released by a wing-nut 24, mounted on the threaded extension of the eyebolt. The meeting edges of the clamping members are notched, as indicated at 25, to fit over the locking-rod 18. It will thus be seen that when the clamping members are loosened the rod may slide through the clamp, which latter swivels freely to accommodate itself to the changing angular relations of the parts, and tightening of the clamp will lock the rod, and thereby prevent relative movement of the parts of the lazy-tongs. In this way the side frames may either be folded together into the position shown in Fig. 2, or they may be partly stretched out into the position shown in Fig. 1, or they may be still further extended into the position shown in Fig. 3, or moved to any intermediate position, and may be locked in any position to which they are thus moved.

To the upper ends of the rearwardmost pair of rearwardly and upwardly extending members—to wit, the members 3—there is pivoted a handle 26, composed of side portions 27 and a cross-bar 28. This handle may be composed of separate pieces, as shown in Figs. 1 to 6 of the drawings, or it may be made in a single piece bent to shape as shown in Fig. 11. The handle may be either placed in the position shown in Fig. 1, in which it forms a direct extension in a straight line of the members 3, or it may be folded down upon the folded body of the vehicle, as shown in Fig. 2, or it may be given any intermediate position—as, for instance, the position shown in Figs. 4, 5, and 6. In order to lock the handle in any desired position, I employ locking means consisting, preferably, of a bracket 29 on each member 3, to each of which is pivoted a rod 30, which passes through a swiveling clamp 31, similar in construction and operation to the swiveling clamp 18ª, already described.

In order to form a seat and back for the vehicle, I employ a flexible band or apron 32, of canvas or other suitable material, the front end of which is secured to the cross-rod 7. The apron 32 then passes under a cross-rod 33, connecting the members 2 below the cross-bar 7, and after passing under the rod 33 said apron passes over the cross-bar 14, and its upper or rear end is connected to a spring-actuated roller 34, carried by the handle 26, in the side members 27 of which its ends are mounted. This spring-actuated roller tends to move in the direction indicated by the arrow in Fig. 5, thereby keeping the apron 32 under a constant tension. In order to limit the paying out of the apron under the weight of the body of the occupant, I employ a mechanism consisting of a ratchet-wheel 35, mounted on the roller at one end thereof, and a gravity-pawl 36, which when it is in the position shown in full lines in Fig. 10 engages with the teeth of the ratchet-wheel, so as to prevent paying out of the apron. The pawl may, however, be moved into the position shown in dotted lines in Fig. 10, in which position it will remain, owing to the excess of weight of the tailpiece of the pawl over the nose-piece or operative part thereof, and when the pawl is in this dotted position the apron may be paid out freely against the action of the spring-roller. The roller 34 has a bearing at that end thereof which carries the ratchet-wheel 35 in a plate 37, secured to the inner face of the side of the handle, and the pawl 36 is pivoted on the same plate, so that any separation of the pawl and ratchet-wheel under the strains of use is prevented and their operativeness is maintained.

When the several parts of the device are adjusted into the position shown in Fig. 1 and locked therein by the mechanism provided for that purpose, it will be seen that the vehicle is practically what is known as a "go-cart," the seat, back, and foot-rest being formed by the apron, which latter may be paid out as desired to form sufficient slack for a comfortable seat, as indicated in dotted lines in Fig. 5, and the paying out being limited when desired by means of the pawl 36. When it is desired to change the position of the parts, the clamps of the lazy-tongs being loosened, downward or upward pressure on the handle is sufficient to extend or contract the body as desired, and it may be extended into the position shown in Fig. 3, so as to form practically a flat bed or couch, or into any intermediate position between that and its smallest compass. During these changes of position, the pawl being thrown into inoperative position, the spring-roller will freely pay out and take up the apron as may be required, and after the desired position is obtained the lazy-tong clamps may be fastened, thus locking the parts in position, and the pawl may be thrown into engagement with the ratchet-wheel to prevent excessive paying out of the apron under the weight of the body of the occupant. If it is desired to lower the handle or to bring its upper extremity farther back, so as to prevent the feet of the person propelling the vehicle from coming into contact with the rear axle, this may be accomplished by loosening the clamps 31 and lowering the handle 26, as indicated in Figs. 4 and 5, this lowering of the handle also bringing it farther back of the rear axle in an obvious manner. When it is desired to fold the vehicle for storage or transport, all of the clamps are loosened, the lazy-tongs are brought together, and the handle is turned back and down in the manner shown in Fig. 2, from which it will be seen that the entire vehicle folds into an extremely small compass, so that it may be readily stored away in a very small space. This is particularly desirable, for instance, when the carriage is to be transported in another vehicle—as, for instance, a buggy—under the seat of which the folded vehicle may readily be slipped. In this folding operation, as in the other movements, the spring-roller takes up all of the slack of the apron. In folding it will be noticed that the front wheels and handle fold inside of the rear wheels and on opposite sides of the folded body, thus promoting the compactness of the folding. It will be noted that the brackets and axles are generally applied at the pivotal points of the parts, so as to strengthen and brace the pivots and afford more permanent bearings.

I do not wish to be understood as limiting myself to the precise details of construction hereinbefore described, and shown in the accompanying drawings, as it is obvious that these details may be varied without departing from the principle of my invention. For instance, where extreme compactness of folding is not desirable the wheels may be made considerably larger, either both at the front and rear or at the rear only, the members thus being correspondingly shortened.

Having thus fully described my invention, what I claim as new, and desire to secure by Letters Patent, is—

1. A folding child's carriage, comprising a body or frame composed of two parallel sets of lazy-tongs, transversely connected and provided with wheels at the front and rear, means for locking said lazy-tongs after adjustment, a handle extending from the rear upper ends of the sets of lazy-tongs, a spring-actuated roller carried by said handle, and a flexible apron connected with said roller at its rear end and having its front end connected to the front of the body or frame, substantially as described.

2. A folding child's carriage, comprising a body or frame composed of two parallel sets of lazy-tongs, transversely connected and provided with wheels at the front and rear, said transverse connections comprising a front cross-bar and two cross-bars rearwardly thereof one above the other, means for locking said lazy-tongs after adjustment, a handle extending from the rear upper ends of the sets of lazy-tongs, a spring-actuated roller carried by said handle, and a flexible apron connected with said roller at its rear end and extending over the upper rear cross-bar, under the lower rear cross-bar and connected at its front end to the front cross-bar, substantially as described.

3. A folding child's carriage comprising a body or frame composed of two parallel sets of lazy-tongs, transversely connected and provided with wheels at the front and rear, means for locking said lazy-tongs after adjustment, a handle extending from the rear upper ends of the sets of lazy-tongs, a spring-actuated roller carried by said handle and provided with a ratchet-wheel, a pawl mounted on said handle to engage said ratchet-wheel, and a flexible apron connected with said roller at its rear end and having its front end connected to the front of the body or frame, substantially as described.

4. A folding child's carriage, comprising a body or frame composed of two parallel sets of lazy-tongs, transversely connected and provided with wheels at the front and rear, means for locking said lazy-tongs after adjustment, a handle extending from the rear upper ends of the sets of lazy-tongs, a spring-actuated roller carried by said handle and provided with a ratchet-wheel, a gravity-pawl mounted on the handle adjacent to the ratchet-wheel and constructed and arranged to remain either in operative or inoperative position when placed therein, and a flexible apron connected with said roller at its rear end and having its front end connected to the front of the body or frame, substantially as described.

5. A folding child's carriage, comprising a body or frame composed of two parallel sets of lazy-tongs, transversely connected and provided with wheels at the front and rear, means for locking said lazy-tongs after adjustment, a handle pivoted to the rear upper ends of the sets of lazy-tongs, means for locking said handle in its adjusted position relatively to the body or frame, a spring-actuated roller carried by said handle, and a flexible apron connected with said roller at its rear end and having its front end connected to the front of the body or frame, substantially as described.

6. A folding child's carriage, comprising a body or frame composed of two parallel sets of lazy-tongs, transverse axles provided with wheels, said axles respectively connecting the front and rear downwardly and rearwardly extending members of the lazy-tongs, a cross-bar connecting the intermediate downwardly and rearwardly extending members, a front cross-bar, a handle provided with a spring-actuated roller, and a flexible apron connected to said roller and to the front cross-bar and passing over the intermediate cross-bar, substantially as described.

7. A folding child's carriage, comprising a body or frame composed of two parallel sets of lazy-tongs, transverse axles connecting the lower portions of said sets at front and rear and provided with wheels lying in different planes, means for locking said lazy-tongs after adjustment, a handle pivoted to the rear upper ends of the sets of lazy-tongs, a spring-actuated roller carried by said handle, and a flexible apron connected with said roller at its rear end and having its front end connected to the front of the body or frame, substantially as described.

8. In a folding carriage of the character described, the combination, with pivotally-connected members, of a locking device comprising a rod pivoted to one member, and a swiveling clamp to receive the end of said rod, mounted on another member and comprising a base-plate, an eyebolt swiveled therein and having a threaded extension, notched clamping-plates mounted on said eyebolt, and a nut mounted on the threaded extension thereof, substantially as described.

In testimony whereof I affix my signature in presence of two witnesses.

STEPHEN R. EVANS.

Witnesses:
STEPHEN E. KIDD,
WALDO E. BAKER.